United States Patent Office 3,449,471
Patented June 10, 1969

3,449,471
PROCESS FOR THE PRODUCTION OF THERMO-PLASTIC MOULDING COMPOSITIONS
Hans Weitzel, Leverkusen, and Karl Dinges and Harry Rohr, Cologne, Germany, assignors to Farbenfabriken Bayer Aktiengesellschaft, Leverkusen, Germany, a corporation of Germany
No Drawing. Filed Aug. 3, 1965, Ser. No. 477,021
Claims priority, application Germany, Sept. 30, 1964, F 44,096
Int. Cl. C08f *15/40, 1/92*
U.S. Cl. 260—880       15 Claims

ABSTRACT OF THE DISCLOSURE

Graft polymers of styrene, acrylonitrile and/or methyl methacrylate on a 1,3-diene prepared by utilization of a reaction medium solvent for the 1,3-diene polymer and monomer reactants which precipitates resulting polymerization products.

---

This invention relates to a process for the production of thermoplastic moulding compositions which are obtained by graft polymerisation of styrene, acrylonitrile and/or methyl methacrylate on to polymers of 1,3-dienes.

It is known that thermoplastic moulding compositions of high impact strength can be produced by combining hard and brittle polymers, such as polystyrene or styrene-acrylonitrile copolymers, with soft, more or less rubber-like polymers, such as butadiene-styrene or butadiene-acrylonitrile copolymers.

There are already a number of processes in which better compatibility of the components is obtained by preparing the hard, resin-like component, for example, from styrene or styrene and acrylonitrile by graft polymerisation in the presence of the already polymerised rubber-like component. Butadiene homopolymers and co-polymers with styrene and/or acrylonitrile are particularly suitable for use as the rubber-like components. Depending on the quantities in which the components are used, these graft polymers have a resin-like, thermoplastic to rubber-like, elastic character. Accordingly, they may be used by themselves as thermoplastic moulding compositions, or alternatively may be mixed with separately prepared thermoplastic polymers, such as styrene-acrylonitrile copolymers, to yield thermoplastic moulding compositions.

Graft polymers of this type may be prepared by block polymerisation, solution polymerisation, supension polymerisation or by emulsion polymerisation.

One of the main difficulties encountered in block polymerisation, solution polymerisation or suspension polymerisation is that there is a limit to the amount of rubber-like graft base which may be used. When the concentration is more than 10%, solutions of the rubber-like graft base in the monomers to be grafted exhibit very high viscosities which, in the case of suspension polymerisation, for example, make it very difficult or even impossible to suspend the polymer-monomer solution in water. In the case of block or solution polymerisation, stirring is made very difficult due to a further rise in the viscosity or, in some cases, to gel-formation. In this case, the heat of polymerisation cannot be uniformly dissipated, with the result that homogeneously and uniformly grafted products are impossible to obtain.

Emulsion polymerisation has the disadvantage that the rubber-like graft base has to be present in, or to be converted into, latex form. This involves a considerable amount of work and, in some cases, is practically impossible to achieve on an industrial scale.

It has now been found that these difficulties can be obviated by carrying out the graft polymerisation of:

(A) 5 to 50% by weight of a 1,3-diene polymer, for example, polybutadiene, polyisoprene or copolymers of butadiene-styrene or butadiene-isoprene, and (B) 95 to 50% by weight of styrene and acrylonitrile in a ratio of 90:10 to 50:50, in which case the styrene may be partly or completely replaced by α-methyl styrene or methyl methacrylate, and the acrylonitrile by methacrylonitrile, or methyl methacrylate on its own, in a solvent or mixture of solvents in which polymer (A) and the monomers (B) are soluble and in which the graft polymer and the polymers of (B) are insoluble.

The moulding compositions may also be prepared by polymerising only part of the monomers (B) in the presence of (A) and by adding the remaining part in already polymerised form.

In this process moulding compositions may be obtained which, although comparable in composition to moulding compositions prepared by known processes, including emulsion polymerisation, exhibit both a higher impact strength and a higher notched impact strength. The process also enables solid rubber to be used in larger quantities than in the known block, solution or suspension polymerisation processes.

Suitable rubber-like graft bases for the process according to the invention include polybutadiene, butadiene copolymers such as butadiene-styrene copolymers containing at least 50% of butadiene, polyisoprene and butadiene-isoprene copolymers.

According to a preferred embodiment, stereospecifically polymerised types of rubber such as, for example, polybutadienes with cis-contents of more than 40%, which are difficult to obtain in the form of a latex, are used as the rubber-like graft base. In the known block, solution and suspension polymerisation processes, there are limits to the quantities in which such materials are used because the cross-linking which accompanies polymerisation makes mixing and the dissipation of heat difficult, whilst, in the case of suspension polymerisation the high solution viscosity renders suspension in aqueous media practically impossible.

In the process according to the invention, styrene and acrylonitrile or their alkyl derivatives, or methyl methacrylate or mixtures of methylmethacrylate and styrene and/or acrylonitrile or their alkyl derivatives, are preferably used as the monomers (B) to be grafted. It is however, possible in principle to use any other type of oleofinically unsaturated compounds which are able to yield hard and brittle compositions when polymerized alone, for example, vinyl chlorine, vinylidene chloride, chlorostyrenes, for example p-chloro-styrene, either individually or in admixture with styrene, acrylonitrile and/or methyl methacrylate.

Suitable solvents for the process according to the invention are, in principle, solvents in which the polymer (A) and the monomers (B) are soluble and in which the graft polymer and the polymers of (B) are insoluble. It is preferred to use saturated aliphatic hydrocarbons containing at least 5 carbon atoms, such as n-hexane, n-heptane, 2,3-dimethyl butane, 2,2,4-trimethyl pentane, n-decane, mixtures of aliphatic hydrocarbons boiling at different temperatures, such as petroleum ether boiling at temperatures in the range from 40 to 80° C., or mixtures of hydrocarbons boiling at temperatures in the range from 170 to 240° C., or saturated cycloaliphatic hydrocarbons with at least 5, preferably 5 to 7, carbon atoms such as cyclopentane, cyclohexane, methylcyclohexane or mixtures of saturated aliphatic and cycloaliphatic hydrocarbons. The solvents are used in quantities varying from 50 to 1,000% by weight, preferably from 150 to 600% by weight, based on the polymer to be prepared.

According to another preferred embodiment, polymerisation is carried out in the presence of saturated, aliphatic alcohols containing 2 to 8 carbon atoms which must be miscible with the aforementioned solvents. Examples of such alcohols are ethanol, n-propanol, isopropanol, isoamyl alcohol, n-octanol or their mixtures.

The alcohol which is used in quantities of 10 to 150% by weight, preferably 50 to 120% by weight based on the polymer to be prepared, produces an increase in the yield and acts as an additional regulator.

According to another, particularly preferred embodiment, the graft polymerisation is carried out in the presence of regulators. In cases where regulators are used, the polymers prepared in accordance with the invention exhibit unexpectedly high impact and notched impact strengths, even with low rubber contents. Examples of regulators are long-chain aliphatic mercaptans such as n- or tert.-dodecyl mercaptan, n-decyl mercaptan or, for example, diisopropyl xanthogene disulphide. The quantity in which the regulator is added may vary from 0.05 to 5% by weight, preferably from 0.1 to 2.0% by weight based on the polymer to be prepared.

According to another preferred embodiment, graft polymerisation is carried out in the presence of monomers with a crosslinking effect containing olefinically unsaturated groups. Examples of such monomers with a crosslinking effect, are used in quantities of 0.01 to 10% by weight, preferably 0.05 to 2% by weight, based on the polymer to be prepared, are glycol diacrylates, glycol dimethacrylates, allyl esters of acrylic acid or methacrylic acid, divinyl benzene or substitution products of these compounds.

The following compounds may be used as the polymerisation catalysts: organic peroxide compounds such as acyl peroxides, for example benzoyl peroxide, alkyl hydroperoxides such as tert.-butyl hydroperoxide, cumene hydroperoxide, p-methane hydroperoxide, dialkyl peroxides such as di-tert.-butyl peroxide, per esters as tert.-butyl peracetate, tert.-butyl perbenzoate, percarbonates such as isopropyl percarbonate or azo compounds such as azodiisobutyronitrile. The organic per compounds may also be used in combination with suitable reducing agents, such as triethanolamine, tetraethylene pentamine, as known per se.

The quantities in which the catalysts are used may vary within the usual limits, i.e. from 0.01 to 5% by weight, based on the polymer to be prepared.

The polymerisation temperatures may vary from 20 to 200° C. although temperatures in the range from 50 to 120° C. are preferably used. Although complete reaction of the monomers is desirable, polymerisation may of course be stopped when reaction is incomplete, for example, when it is 40 to 45% complete.

According to a preferred embodiment, the polymerisation process according to the invention is carried out as follows:

The rubber-like graft base (A) is dissolved in a mixture comprising the solvent, optionally the alcohol, the monomers (B) and, optionally the regulator, at temperatures of 20 to 40° C. in a polymerisation vessel equipped with stirring mechanism. The alcohol, monomers (B) and the regulator may, however, be added after the graft base has been dissolved. After the polymerisation catalyst has been added, polymerisation is initiated by raising the temperature and is carried out at a suitable temperature with intensive stirring. On completion of polymerisation, i.e. after the required degree of polymerisation has been reached, 40 to 200% by weight, preferably 60 to 140% by weight of a precipitant which does not swell the graft polymer and the polymers of (B), for example, ethyl alcohol, are added, after which the polymer is suction-filtered, washed with a solvent which does not swell it and then dried in vacuo at temperatures from 20 to 90° C.

The graft polymer may of course also be prepared by a continuous process.

The graft polymer may also be isolated by removing the solvent and any unreacted monomers by azeotropic distillation using hot water or steam, optionally in vacuo.

The polymer obtained in powder form or grain form after drying may be consolidated on mixing rolls or kneaders at temperatures of from 140 to 180° C., and may be processed in the usual way to form a granulate, in which case other polymers, for example, styrene-acrylonitrile resins, and pigments, dyes, lubricants or anti-agers, may be added, either before or during processing.

The products obtained by the process according to the invention may be moulded into a variety of objects by the processes in which thermoplastic compositions are normally employed. For example, the granulate may be processed in injection moulding apparatus to form a variety of mouldings. Profiles, sheets or tubes may be manufactured by means of screw extruders. The sheets may be further processed to form casings and containers by a variety of vacuum processes.

The process according to the invention is illustrated by the following examples. The parts indicated are always parts by weight.

EXAMPLE 1

Using a 6-litre glass vessel equipped with stirring mechanism and a reflux condenser, 62.5 parts of a gel-free soluble polybutadiene with a Mooney viscosity of 29 obtained by emulsion polymerisation and containing about 66% of 1,4-trans-polybutadiene and about 19% of 1,4-cis-polybutadiene, are dissolved in a mixture of 2,100 parts of a mixture of aliphatic hydrocarbons boiling at 80 to 110° C., 480 parts of n-propanol, 317 parts of styrene and 120.5 parts of acrylonitrile. The air is displaced from the reaction vessel by introducing nitrogen, after which polymerisation is carried at 75° C. by adding 2.6 parts of benzoyl peroxide and 1.2 parts of tert.-butylperbenzoate. After 14 hours, a further 0.8 part of tert.-butylperbenzoate are added, and the temperature is raised to 85° C. After a total of some 24 hours, a polymer is obtained in a yield of 88% and is suction-filtered after the addition of 500 parts of isopropyl alcohol. The material, which is in the form of fine crumbs, is washed with isopropyl alcohol and dried in vacuo at 65 to 70° C. After the addition of 15 parts of an anti-ager, for example 2,2'-methylene - bis-4-methyl-6-cyclohexyl phenol, the dried material is consolidated on mixing rolls heated at 160° C., drawn off in the form of strips and crushed in a beater mill. The resulting granulate is injection-moulded to form standard test bars which were found to possess the mechanical data given in Table 1.

EXAMPLES 2 to 4

In a manner similar to Example 1, 297 parts of styrene and 115.5 parts of acrylonitrile are polymerised in the presence of 87.5 parts of polybutadiene of identical structure (Example 2), 280 parts of styrene and 108 parts of acrylonitrile are polymerised in the presence of 112.5 parts of polybutadiene of identical structure (Example 3), and 261 parts of styrene and 101.5 parts of acrylonitrile are polymerised in the presence of 137.5 parts of polybutadiene of identical structure (Example 4). The polymers obtained in yields of 85 of 90% are worked up, and further processed as in Example 1. The mechanical data of the resulting products are given in Table 1.

Comparison Example A

This comparison example illustrates the comparatively poor properties of a graft polymer which was prepared by emulsion polymerisation using the same polybutadiene latex from which the polybutadiene used in Examples 1 to 4 was obtained.

706 parts of distilled water, 20 parts of the sodium salt of disproportionated abietic acid and 5 parts of 50% by weight sodium hydroxide solution, are added to 382 parts of polybutadiene latex containing 87.5 parts of polybutadiene. After emulsification of the resulting mixture with 297 parts of styrene and 115.5 parts of acrylonitrile, the temperature of the stirred emulsion is raised to 60° C. Polymerisation is initiated by the addition of 1.5 parts of potassium persulphate. During polymerisation, which is complete after 5 hours, the temperature is kept at 60 to 65° C. by external cooling. After the addition of 17.5 parts of the anti-ager used in Example 1, the resulting, approximately 32% by weight graft polymer latex is coagulated with 2% by weight acetic acid, after which the coagulate is separated off, washed neutral and dried in vacuo at 70° C. The dried material is further processed as in Example 1. The mechanical data of the resulting moulding composition are given in Table 1.

Comparison Example B

The procedure is as in comparison Example A, except that a quantity of latex containing 137.5 parts of polybutadiene, and 261 parts of styrene and 101.5 parts of acrylonitrile are used. The graft polymer is worked up and further processed as in comparison Example A. The mechanical data of this polymer are given in Table 1.

Comparison of the polymers prepared in accordance with the invention with polymers prepared by emulsion polymerisation:

80 to 110° C., 50 parts of n-propanol, 324 parts of styrene and 126 parts of acrylonitrile. Air is displaced from the flask by introducing nitrogen. 2.7 parts of benzoyl peroxide and 0.9 part of tert.-butylhydroperoxide are then added. Polymerisation is carried out by raising the temperature to 75 to 80° C. After 18 hours, a further 1.4 parts of benzoyl peroxide are added. After the addition of 450 parts of ethyl alcohol after some 26 hours, the finely divided polymer obtained in a yield of 90% of theoretical can be suction-filtered. After drying in vacuo at 65 to 70° C. the fine powder is further processed as described in Example 1. The resulting moulding composition exhibits the data given in Table 2.

EXAMPLES 6 TO 9

In a manner similar to Example 5, 315 parts of styrene and 122.5 parts of acrylonitrile are polymerised in the presence of 62.5 parts of polybutadiene of identical structure (Example 6), 297 parts of styrene and 115.5 parts of acrylonitrile are polymerized in the presence of 87.5 parts of polybutadiene of identical structure (Example 7), 279 parts of styrene and 108.5 parts of acrylonitrile are polymerised in the presence of 112.5 parts of polybutadiene of identical structure (Example 8) and 261 parts of styrene and 101.5 parts of acrylonitrile are polymerised in the presence of 137.5 parts of polybutadiene of identical structure (Example 9). The graft polymers obtained in yields of 85 to 90% are worked up and further processed as in Example 1. The mechanical data of the resulting products are given in Table 2.

EXAMPLES 10 TO 11

297 parts of styrene and 115.5 parts of acrylontrile are polymerised in the presence of 87.5 parts of polybutadiene with a cis-1,4-content of more than 90% and a

TABLE 1

|  | Test Examples | | | | Comparison Examples | |
| --- | --- | --- | --- | --- | --- | --- |
|  | 1 | 2 | 3 | 4 | A | B |
| Polybutadiene component (percent by weight) | 12.5 | 17.5 | 22.5 | 27.5 | 17.5 | 27.5 |
| Styrene-acrylonitrile component (72:28) (percent by weight) | 87.5 | 82.5 | 77.5 | 72.5 | 82.5 | 72.5 |
| Notched impact strength acc. to DIN 53453 in kp. cm./cm.$^2$ at— | | | | | | |
| 20° C | 13.0 | 27.8 | 30.9 | 33.4 | 3.5 | 6.3 |
| 0° C | 7.4 | 23.5 | 26.6 | 31.5 | | |
| −20° C | 5.6 | 20.4 | 25.3 | 28.4 | | |
| −40° C | 4.9 | 5.6 | 16.7 | 25.3 | | |
| Impact strength acc. to DIN 53453 in kp. cm./cm.$^2$ at 20° C | 111 | Unbroken | | | 31 | 43 |

Comparison of the results of test Examples 1 to 4 with those of comparison Examples A and B, shows that products prepared in accordance with the invention exhibit considerably higher notched impact strengths.

EXAMPLE 5

Into a glass flask equipped with stirring mechanism and a reflux condenser, there is introduced a solution of 50 parts of a polybutadiene with a cis-1,4-content of more than 90% and a Mooney viscosity of 29, in a mixture comprising 1900 parts of mixed hydrocarbons boiling at Mooney viscosity of 29, as in Example 7, except that, in Example 10, the polymerisation reaction is carried out in the presence of 0.5 parts of tert.-dodecyl mercaptan and, in Example 11, in the presence of 2.5 parts of tert.-dodecyl mercaptan. The polymers obtained in yields of 87 and 84%, respectively, are worked up and further processed as already described. The mechanical data of the resulting products are given in Table 2.

Comparison of the polymers prepared in accordance with the invention with different rubber and regulator contents:

TABLE 2

| Example | 5 | 6 | 7 | 8 | 9 | 10 | 11 |
| --- | --- | --- | --- | --- | --- | --- | --- |
| Polybutadiene component (percent by wt.) | 10 | 12.5 | 17.5 | 22.5 | 27.5 | 17.5 | 17.5 |
| Styrene-acrylonitrile component (72:28) (percent by wt.) | 90 | 87.5 | 82.5 | 77.5 | 72.5 | 82.5 | 82.5 |
| Amount of tert., dodecyl mercaptain added (percent by wt.) | | | | | | 0.1 | 0.5 |
| Notched impact strength acc. to DIN 53453 in kp. cm./cm.$^2$ at— | | | | | | | |
| 20° C | 4.9 | 6.8 | 14.8 | 32.1 | 25.9 | 16.4 | 31.5 |
| 0° C | | 5.5 | 14.2 | 24.1 | 23.5 | 15.7 | 26.6 |
| −20° C | | 4.9 | 10.5 | 21.6 | 22.4 | 14.3 | 23.5 |
| −40° C | | 4.9 | 19.1 | 20.4 | 6.8 | 12.3 | |
| Impact strength acc. to DIN 53453 in kp. cm./cm.$^2$ at 20° C | 40.8 | 71.2 | | Unbroken | | | |

EXAMPLE 12

As in Example 5, 261 parts of styrene and 101.5 parts of acrylonitrile are polymerised in the presence of 137.5 parts of polybutadiene with a cis-1,4-content of more than 90% and a Mooney viscosity of 29, 1.0 part of tert.-dodecyl mercaptan being added. The resulting graft polymer which is worked up and further processed as already described, had the following notched impact strengths at:

| | Kp. cm./cm.$^2$ |
|---|---|
| 20° C. | 33.9 |
| 0° C. | 31.2 |
| −20° C. | 28.8 |
| −40° C. | 24.7 |

None of the test specimens broke during the impact strength tests.

EXAMPLE 13

As already described in Example 12, a graft copolymer containing 27.5% of polybutadiene is prepared from 522 parts of styrene, 203 parts of acrylonitrile and 275 parts of polybutadiene of identical structure, in the presence of 2 parts of tert.-dodecyl mercaptan. The graft polymer is worked up as described in the foregoing examples.

318 parts of this graft polymer are mixed at 165 to 170° C. in a two-roll mill with 182 parts of a styrene-acrylonitrile resin (styrene-acrylonitrile=72:28) prepared by a known emulsion polymerisation process and having a K-value of 60 [K-value: according to Fikentscher, Cellulose Chemie 13, p. 58 (1932), measured on a 0.5% solution at 20° C. in dimethyl formamide] and 20 parts of an anti-ager, for example, 2,2'-methylene-bis-4-methyl-6-cyclohexyl phenol. The resulting consolidated mass is drawn off in the form of strips and granulated in a beater mill. The granulate is injection-moulded to form standard test bars which exhibited the mechanical data given in Table 3.

EXAMPLE 14

As in Example 13, 227 parts of the graft polymer described in that example are mixed at 165 to 170° C. in a two-roll mill with 273 parts of the styrene-acrylonitrile resin used in Example 13 and 20 parts of an anti-ager, and the mixture is further processed as in Example 13. The mechanical data of the resulting products are given in Table 3.

Comparison Example C 3,660 parts of 29.6% by weight latex of a graft polymer of 36% by weight of styrene and 14% by weight of acrylonitrile on 50% by weight of polybutadiene, prepared by conventional emulsion polymerisation processes, are mixed with 4,680 parts of a 43% by weight latex of a copolymer of 72% by weight of styrene and 28% by weight of acrylonitrile with a K-value of 59.3. The graft polymer:resin ratio is 35:65, i.e. the mixture contains 17.5% by weight of polybutadiene. 63.3 parts of a 16.6% by weight aqueous emulsion of 2,2'-methylene-4-methyl-6-cyclohexyl phenol used as the anti-ager (this amounts to 0.35% by weight of anti-ager, based on solid polymer) were stirred into the latex mixture. The stabilised polymer mixture is coagulated with 2% by weight acetic acid, the coagulate is separated off, washed neutral and dried in vacuo at 70 to 80° C.

The dried polymer mixture is moulded into standard test bars as described in Example 1. The mechanical data of standard test bars are given in Table 3.

Comparison of the graft polymers prepared in accordance with the invention, with graft polymers prepared by emulsion polymerisation in the form of mixtures with styrene-acrylonitrile copolymer.

TABLE 3

| | Test Examples | | Comparison Example |
|---|---|---|---|
| | 13 | 14 | C |
| Polybutadiene component (percent by weight) | 17.5 | 12.5 | 17.5 |
| Total styrene-acrylonitrile component (77:28) (percent by weight) | 82.5 | 87.5 | 82.5 |
| Notched impact strength acc. to DIN 53453 kp. cm./cm.$^2$ at— | | | |
| 20° C | 16.8 | 8.8 | 9.9 |
| 0° C | 15.9 | 7.9 | 8.0 |
| −20° C | 13.7 | 5.4 | 5.6 |
| −40° C | 10.3 | 4.2 | 4.3 |
| Impact strength acc. to DIN 53453 kp. cm./cm.$^2$ at 20° C | ($^1$) | 87.3 | 94.0 |

$^1$ Unbroken.

EXAMPLE 15

As already described in Example 5, 279 parts of styrene and 108 parts of acrylonitrile are polymerised in the presence of 112 parts of a polybutadiene with a cis-1,4-content of more than 90% and a Mooney viscosity of 90. The graft polymer obtained in a yield of 88% of theoretical is worked up and further processed as described above. Measurement of the notched impact strength (according to DIN 53453) produces the following results at:

| | Kp. cm./cm.$^2$ |
|---|---|
| 20° C. | 30.9 |
| 0° C. | 29.0 |
| −20° C. | 25.9 |
| −40° C. | 23.7 |

None of the standard test bars broke during the impact strength tests (according to DIN 53453) at 20° C.

EXAMPLE 16

As in Example 5, 297 parts of styrene and 115.5 parts of acrylonitrile are polymerised in the presence of 87.5 parts of a polybutadiene with a 1,2-content of 18%, a cis-1,4-content of 34% and a Mooney viscosity of 46, 1.5 parts of tert.-dodecyl mercaptan being added. The polymer obtained in a yield of 89% of theoretical is worked up and further processed as described above. Measurement of the notched impact strength yielded the following results at:

| | Kp. cm./cm.$^2$ |
|---|---|
| 20° C. | 26.6 |
| 0° C. | 22.2 |
| −20° C. | 20.4 |
| −40° C. | 17.9 |

None of the standard test bars used as the test specimens broke during the impact strength tests (according to DIN 53453) at 20° C.

EXAMPLE 17

As an in Example 5, 472 parts of styrene and 182 parts of acrylonitrile are polymerised in the presence of 250 parts of the polybutadiene used in Example 16, 1.2 parts of tert.-dodecyl mercaptan being added. The polymer obtained in a yield of 84% of theoretical is worked up and further processed as already described. Measurement of the notched impact strength yielded the following results at:

| | Kp. cm./cm.$^2$ |
|---|---|
| 20° C. | 29.4 |
| 0° C. | 23.2 |
| −20° C. | 19.9 |
| −40° C. | 17.6 |

As in the case of the polymer prepared in accordance with Example 16, none of the standard test bars produced from this polymer broke during the impact strength tests, carried out at 20° C.

EXAMPLE 18

680 parts of a polybutadiene with a cis-1,4-content of more than 90% and a Mooney viscosity of 57 are dissolved in a mixture comprising 11,700 parts of n-hexane, 1682 parts of styrene, 651 parts of acrylonitrile, 2900 parts of n-butanol and 9 parts of tert.-dodecyl mercaptan in a 40-litre stainless steel autoclave. Air is displaced from the autoclave by introducing nitrogen. After the addition of 17 parts of benzoyl peroxide and 4 parts of tert.-butyl perbenzoate, polymerisation is initiated by raising the temperature to 75° C. After polymerisation has been in progress for 15 hours, another 4 parts of benzoyl peroxide and 2 parts of tert.-butyl perbenzoate are added, and the temperature is raised to 85° C. After a total of 22 hours, the graft polymer obtained in a yield of 91% of theoretical is suction-filtered after the addition of 2,600 parts of n-propanol, carefully washed with ethanol and dried in vacuo at 80° C. After the addition of 55 parts of an anti-ager, the dried polymer is consolidated in a roll mill heated at 170° C., after which it is drawn off in the form of strips and crushed in a beater mill. The resulting granulate is injection-moulded to form standard test bars which were found to have the following data at:

Notched impact strength (DIN 53453)

| | Kp. cm./cm.$^2$ |
|---|---|
| 20° C. | 34.8 |
| 0° C. | 26.1 |
| −20° C. | 24.4 |
| −40° C. | 21.2 |

Impact strength at 20° C. unbroken.

EXAMPLE 19

As already described in Example 18, 1,682 parts of styrene and 651 parts of acrylonitrile are polymerised in the present of 680 parts of polybutadiene of identical structure after the addition of 9 parts of tert.-dodecyl mercaptan, cyclohexane being used in place of n-hexane. The polymer obtained in a yield of 81% of theoretical is worked up and further processed as in Example 18. Measurement of the notched impact strength yielded the following results at:

| | Kp. cm./cm.$^2$ |
|---|---|
| 20° C. | 28.4 |
| 0° C. | 26.6 |
| −20° C. | 24.3 |
| −40° C. | 20.9 |

None of the test specimens broke during impact strength testing at 20° C.

EXAMPLE 20

As already described in Example 18, 841 parts of styrene and 325.5 parts of acrylonitrile are polymerised in the presence of 340 parts of polybutadiene of identical structure after the addition of 4.5 parts of tert.-dodecyl mercaptan, a hydrocarbon mixture boiling at 160 to 195° C. being used in place of n-hexane. The graft copolymer obtained in yield of 83% of theoretical is worked up and further processed as described in Example 18. Measurement of the notched impact strength yielded the following results at:

| | Kp. cm./cm.$^2$ |
|---|---|
| 20° C. | 24.7 |
| 0° C. | 20.5 |
| −20° C. | 18.0 |
| −40° C. | 15.6 |

During the impact strength tests carried out at 20° C., three out of ten standard test bars broke at 82.9 kp./cm.$^2$.

EXAMPLE 21

87.5 parts of a polybutadiene with a cis-1,4-content of more than 90% and a Mooney viscosity of 34, are dissolved in a mixture of 2,000 parts of a hydrocarbon mixture boiling at 80 to 110° C., 485 parts of n-propanol, 412.5 parts of methyl methacrylate and 2.5 parts of tert.-dodecyl mercaptan, in a 6-litre glass vessel equipped with stirring mechanism and a reflux condenser, from which air is displaced by introducing nitrogen. The solution is then heated to 75° C., after which it is polymerised for a total of 23 hours at 75 to 80° C. after the addition of 2.9 parts of benzoyl peroxide and 1.8 parts of tert.-butyl perbenzoate. The polymer obtained in a yield of 94% of theoretical is worked up and further processed as already described. Measurement of the notched impact strength yielded the following results at:

| | Kp. cm./cm.$^2$ |
|---|---|
| 20° C. | 10.6 |
| 0° C. | 9.4 |
| −20° C. | 8.8 |
| −40° C. | 7.7 |

Measurement of the impact strength at 20° C. yields a value of 68.8 kp. cm./cm.$^2$.

EXAMPLE 22

As in Example 5, 197 parts of styrene and 115.5 parts of acrylonitrile are polymerised in the presence of 87.5 parts of a polyisoprene with a cis-1,4-content of 33%, a 3,4-content of 66% and a Mooney viscosity of 37, after the addition of 1.9 parts of n-dodecyl mercaptan. The graft polymer obtained in a yield of 87% of theoretical is worked up and further processed as already described. Measurement of the notched impact strength produces the following results at:

| | Kp. cm./cm.$^2$ |
|---|---|
| 20° C. | 9.1 |
| 0° C. | 6.8 |
| −20° C. | 4.9 |

Measurement of the impact strength at 20° C. produced a value of 82.5 kp. cm./cm.$^2$.

EXAMPLE 23

As in Example 5, 275 parts of styrene and 117.5 parts of acrylonitrile are polymerised in the presence of 107.5 parts of a butadiene-styrene copolymer with a styrene content of 25% by weight and a Mooney viscosity of 35, after the addition of 0.8 parts of tert.-dodecyl mercaptan. The graft polymer obtained in a yield of 84% of theoretical is worked up and further processed as already described. Measurement of the notched impact strength yields the following results at:

| | Kp. cm./cm.$^2$ |
|---|---|
| 20° C. | 27.2 |
| 0° C. | 21.8 |
| −20° C. | 16.9 |
| −40° C. | 7.8 |

None of the standard test bars broke during the impact strength tests carried out at 20° C.

EXAMPLE 24

As in Example 5, 297 parts of styrene and 115.5 parts of acrylonitrile are polymerized in the presence of 87.5 parts of a polybutadiene with a cis-1,4-content of more than 90% and a Mooney viscosity of 30, after the addition of 0.4 parts of tert.-dodecyl mercaptan and 0.7 parts of divinyl benzene. The graft polymer obtained in a yield of 91% of theoretical is worked up and further processed as already described. Measurement of the notched impact strength yields the following results at:

| | Kp. cm./cm.$^2$ |
|---|---|
| 20° C. | 30.6 |
| 0° C. | 28.7 |
| −20° C. | 24.0 |
| −40° C. | 22.7 |

One out of ten test specimens broke at 98.5 kp. cm./cm.$^2$ during the impact strength tests carried out at 20° C.

We claim:
1. In a process for producing thermoplastic moulding compositions of high impact and notched impact strength from (A) 5 to 50% by weight of a member selected from the group consisting of 1,3-diene homo- and copolymers and (B) 95 to 50% by weight of:
   (a) a member of the group consisting of styrene, α-methylstyrene, methyl methacrylate and mixtures thereof and
   (b) a member of the group consisting of acrylonitrile, methacrylonitrile, methyl methacrylate and mixtures thereof
in a weight ratio a:b of 90:10 to 50:50 by polymerizing at least a part of (B) in the presence of (A), the improvement which comprises carrying out said polymerization in an organic solvent in which (A) and (B) are soluble but in which the polymer from (A) and (B) and polymerized (B) is insoluble and then recovering resulting precipitated polymer, said solvent being selected from the group consisting of saturated alphatic hydrocarbons, saturated cycloaliphatic hydrocarbons and mixtures thereof.

2. Process according to claim 1 wherein said 1,3-diene polymer (A) is a polybutadiene having a content of 1,4-cis linkages of at least 40%.

3. Process according to claim 1, wherein said organic solvent is a mixture of saturated aliphatic hydrocarbons boiling at 80 to 110° C.

4. Process according to claim 1, wherein said organic solvent is n-hexane.

5. Process according to claim 1, wherein said organic solvent is cyclohexane.

6. Process according to claim 1 wherein (a) is styrene and (b) is acrylonitrile.

7. Process according to claim 1 wherein (a) is a mixture of styrene and methyl methacrylate and (b) is acrylonitrile.

8. Process according to claim 1 wherein the polymerization is conducted in the presence of a saturated aliphatic alcohol.

9. Process according to claim 8, wherein said saturated aliphatic alcohol is n-propanol.

10. Process according to claim 8 wherein the solvent is used in from 50 to 1,000% by weight based on the weight of the monomers.

11. Process according to claim 8 wherein the alcohol is present in an amount of from 10 to 150% by weight of the monomers.

12. Process according to claim 6 wherein the polymerization is conducted in the presence of a chain regulating agent.

13. Process according to claim 1 wherein the polymerization is conducted in the presence of from 0.01 to 10% by weight based upon the weight of final polymer of a cross linking agent.

14. Process according to claim 13, wherein said cross-linking agent is divinyl benzene.

15. Process according to claim 1 wherein the 1,3-diene homo- and copolymer is a member selected from the group consisting of polybutadiene, polyisoprene, copolymers of butadiene and styrene and copolymers of butadiene and isoprene.

References Cited
UNITED STATES PATENTS

| | | | |
|---|---|---|---|
| 3,337,650 | 8/1967 | Marcil | 260—880 |
| 3,262,994 | 7/1966 | Hagemeyer et al. | 260—880 |
| 3,099,293 | 7/1963 | Lakritz et al. | 138—141 |

SAMUEL H. BLECH, *Primary Examiner.*

C. J. SECCURO, *Assistant Examiner.*

U.S. Cl. X.R.

260—33.4, 33.6, 45.95, 876, 879